United States Patent [19]

Schulte

[11] 4,202,263
[45] May 13, 1980

[54] SCRAP SHEARING MACHINES

[75] Inventor: Heinrich Schulte, Witten-Herbede, Fed. Rep. of Germany

[73] Assignee: Lindemann Maschinenfabrik GmbH, Düsseldorf, Fed. Rep. of Germany

[21] Appl. No.: 913,543

[22] Filed: Jun. 8, 1978

[30] Foreign Application Priority Data

Jun. 18, 1977 [DE] Fed. Rep. of Germany ....... 2727436

[51] Int. Cl.² .............................................. B30B 9/32
[52] U.S. Cl. ................................. 100/95; 100/DIG. 1; 100/137; 100/215; 100/233; 100/295
[58] Field of Search .................... 100/94, 95, 295, 233, 100/232, 215, DIG. 2, DIG. 1, 98 R, 231, 137

[56] References Cited

U.S. PATENT DOCUMENTS

| 3,049,988 | 8/1962 | Lindemann | 100/95 |
| 3,101,045 | 8/1963 | Van Endert | 100/233 |
| 3,113,506 | 12/1963 | Faeber | 100/295 X |
| 3,130,761 | 4/1964 | Fleming | 100/295 X |
| 3,141,401 | 7/1964 | Lindemann | 100/95 X |
| 3,283,697 | 11/1966 | Findlay | 100/95 |
| 3,334,581 | 8/1967 | Bergman | 100/231 X |
| 3,945,315 | 3/1976 | Dahlem | 100/95 |

FOREIGN PATENT DOCUMENTS 4922499 6/1974 Japan ..................... 100/DIG. 1

Primary Examiner—Billy J. Wilhite
Attorney, Agent, or Firm—Toren, McGeady and Stanger

[57] ABSTRACT

A scrap shearing machine comprises a pair of relatively movable shearing blades arranged in a shear frame 1, a crusher 6 positioned upstream of the shearing blades 3, 5, a filling trough 8 arranged upstream of the cutter frame 1, a feed device to feed scrap along the trough 8 towards the crusher, press bar 11, 19 for precompacting the scrap in the trough 8 to a predetermined size to enable the crusher 8 and shearing blades 3, 8 to accommodate it. The shearing blades 3, 5 the crusher 8 and the press bar 11, 19 are located in a common plane X—X. The filling trough 8 is connected to the shear frame 1 by a force transferring connection, so that the shear frame 1 reinforces the filling trough 8.

7 Claims, 4 Drawing Figures

SCRAP SHEARING MACHINES

This invention relates to a scrap shearer, comprising a pair of relatively movable shearing blades arranged in a shear frame, a crusher upstream of the shearing blades, a filling trough upstream of the shear frame, a feed device for feeding scrap along the trough towards the crusher, and a press bar for pre-compacting the scrap in the trough to a predetermined size to enable the crusher and the shearing blades to accomodate it.

Scrap shearers of this type are known, for example such a shearer is described in German published Patent Specification No. 2 056 715. The forces acting on the shears and crusher of such a shearer which the shear frame has to withstand are considerably larger than the forces acting on the filling trough when the shearer acts on low density scrap. Thus the shear frame is conventionally made very much stronger than the filling trough. However, when it is required to process scrap of a higher density it is desirable to increase the compressing capacity of the press bar in the filling trough to enable such scrap to be compacted directly to the appropriate size by the press bar. The compression of such scrap results in stresses on the filling trough which are comparable with those occurring in the shear frame. Examples of such higher density scrap are large volume containers and car sub-structures, and to date, these have had to be divided into smaller parts by the use of cutting torches.

Clearly, it is possible to accommodate these stresses by reinforcing the construction of the filling trough and increasing the power driving the press bar. However, as such high density scrap is not expected during the whole operation of the shearer such a step would lead to such a disproportionate increase in the production cost of the shearer that any economies in the initial processing would thereby be nullified or even be reversed.

It is an object of this invention to construct a scrap shearer similar to the above type having a similar driving force for the press bar and generally similar construction of the filling trough which can accommodate higher density scrap without overloading the filling trough and its drive.

According to this invention a scrap shearer comprises a pair of relatively movable shearing blades arranged in shear frame, a crusher positioned upstream of the shearing blades, a filling trough which is arranged upstream of the shear frame, a feed device to feed scrap along the trough towards the crusher, and a press bar for precompacting the scrap in the trough to a predetermined size to enable the crusher and shearing blades to accommodate it, the pair of shearing blades, the crusher and the press bar being located in a common plane, and the filling trough being connected to the shear frame by a force transferring connection so that the shear frame reinforces the filling trough.

Thus the shear frame reinforces the filling trough and with the shearing blades, the crusher and the press bar all acting in the same plane the shear frame readily accommodates this extra load.

Preferably the common plane is inclined to the horizontal and the preferred inclination is 45°. This results in a low height of the machine, coupled with an easy-to-feed, hopper-like top opening of the filling trough as a top of the trough is opened. The material fed in slides under gravity into the working zone of the feed device of the trough and enlongate material centres itself before operation of the press bar.

A particularly favourable shearer is obtained if the crusher is connected to the end of the press bar adjacent to it through at least one pivotal connection. In this way without large material and production costs the crusher also provides the major portion of the lateral push force for the press bar leading to an improved transfer of the peak loading on the press bar to the shear frame.

Preferably the crusher is pivotally connected to one side of an end plate and the press bar is pivotally connected to the other side of the end plate, and a ram is connected between the joint at the other side of the end plate and the shear frame. In this way, a transition between the crusher and the press bar is achieved, the inclination of which is infinitely adjustable, thereby facilitating the insertion of scrap beneath the crusher for step-wise compaction. This operation to compact the scrap step-wise over a length which is to be severed during the next shearing stroke is of particular advantage for denser scrap since the available push force is concentrated over a smaller area.

The pre-compaction in the filling trough is more flexible and versatile with respect to the way in which it contacts the scrap material if the drive ram for the press bar is connected to the end of the press bar remote from the crusher. This enables the working surfaces of the press bar and the end plate, when this is provided, to move in line with and together with the crusher or to be inclined to the crusher. Moreover, in the preferred example it is possible to arrange for the ram acting on joint linking the end plate with the press bar to exert a concentrated or a linear force.

Two examples of scrap shearers in accordance with this invention will now be described with reference to the accompanying drawings; in which.

Figure 1:
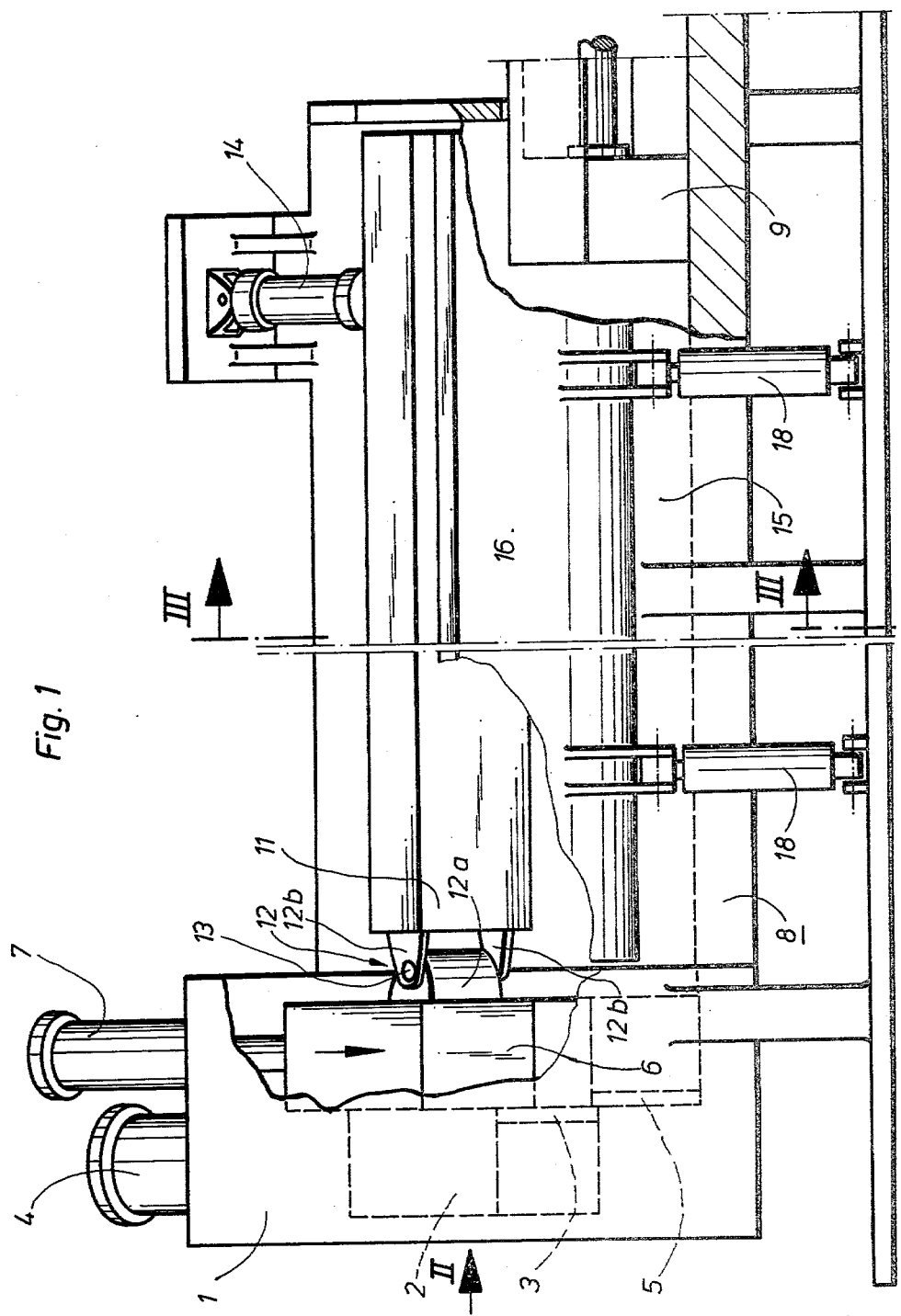
FIG. 1 is a partly sectioned side elevation of the first example.

An upper blade carrier 2 with an upper shearing blade 3 mounted on it is movably mounted in a shear frame 1 and coupled with a ram 4. The upper shearing blade 3 co-operated with a stationary lower shearing blade 5. Further, a crusher 6 which is actuated by a ram 7 is guided in the shear frame adjacent the upper blade carrier 2. A filling trough 8 which has a conveyor ram 9 movable through the trough lengthwise to push the scrap towards the shearing blades is connected to the shear frame in a force transferring manner so that the shear frame reinforces the filling trough. A press bar 11 movable transversely to the conveyor ram 9 forms one side of the filling trough 8 and it pre-compacts the scrap to the appropriate size to allow it to move under the crusher 6 and blade 3. The pair of shearing blades 3, 5, and the crusher 6, the conveyor ram 9 and the press bar 11 are located in and act in a common plane X—X which is inclined to the horizontal at an angle of 45°. Since all these act in the same plane the shear frame 1 serves to reinforce the filling trough 8 so that it can withstand the reaction force of the press bar 11 on the scrap being pre-compacted in the trough 8.

In the first example the crusher 6 is coupled to the press bar 11 via a hinge linkage 12 comprising a trunnion 12a connected to the crusher, two shackles 12b attached to the press bar 71, and a bolt 13 passing through the shackles and trunnion. At the end remote from the shear frame 1, the press bar 11 is pivotably linked to a ram 14.

Figure 2:
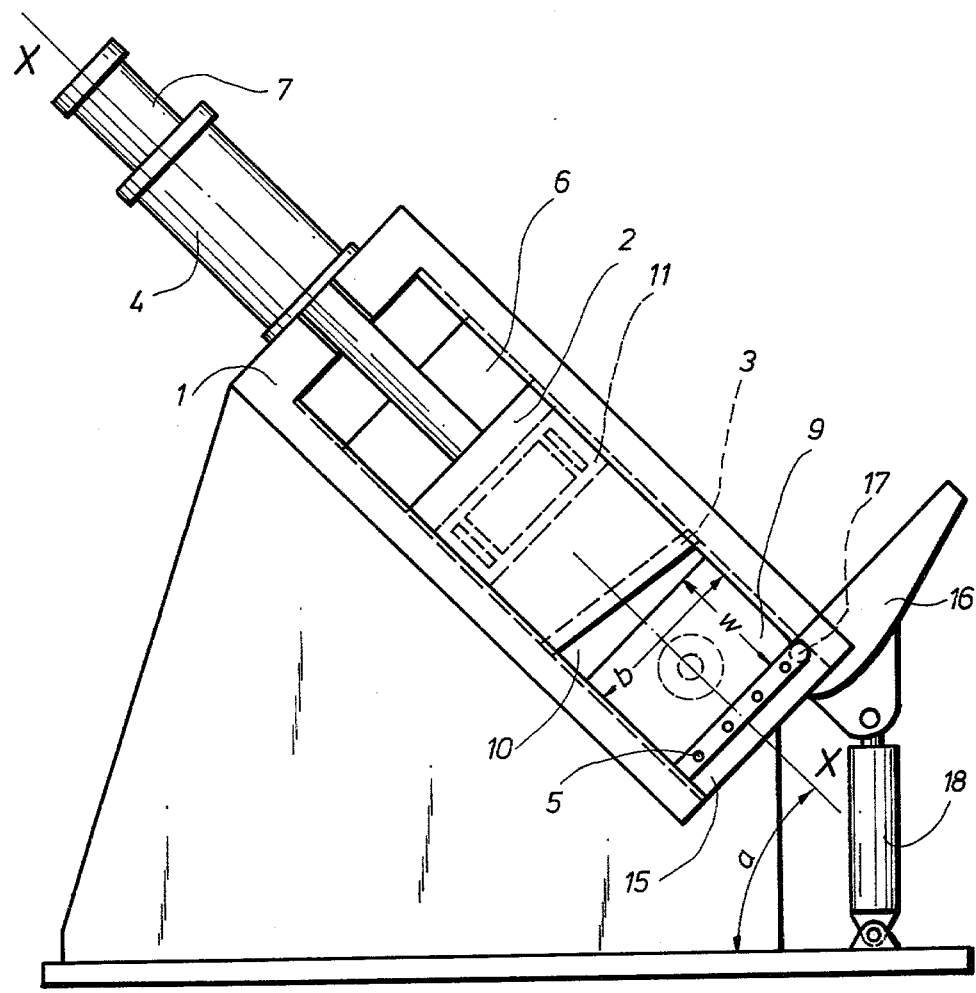
FIG. 2 is a front elevation taken in the direction of the arrow II looking towards the cutter jaws of the first example.
Figure 3:
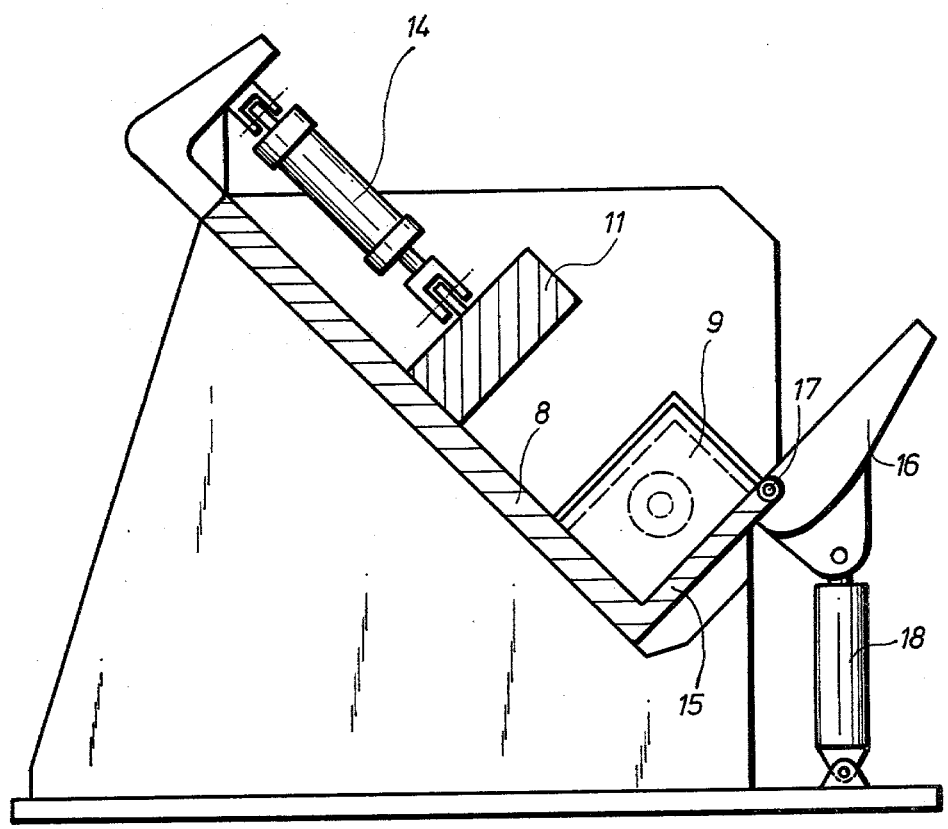
FIG. 3 is a vertical sectional elevation taken along the line III—III shown in FIG. 1; and, FIG. 4 is a somewhat diagrammatic sectional elevation taken in the common plane of a second example.

A compacting lid 16 is pivotally mounted via a hinge 17 on a wall 15 of the filling trough 8 opposite the press bar 11, and it can be moved by means of two rams 18 into the filling trough 8 to a depth corresponding to the cutting width b of the shearing blades. In the open state shown in FIG. 2, the compacting lid 16 forms an extension of the wall 15 of the filling trough 8 and in this way, the filling trough forms an easy-to-feed hopper.

Figure 4:
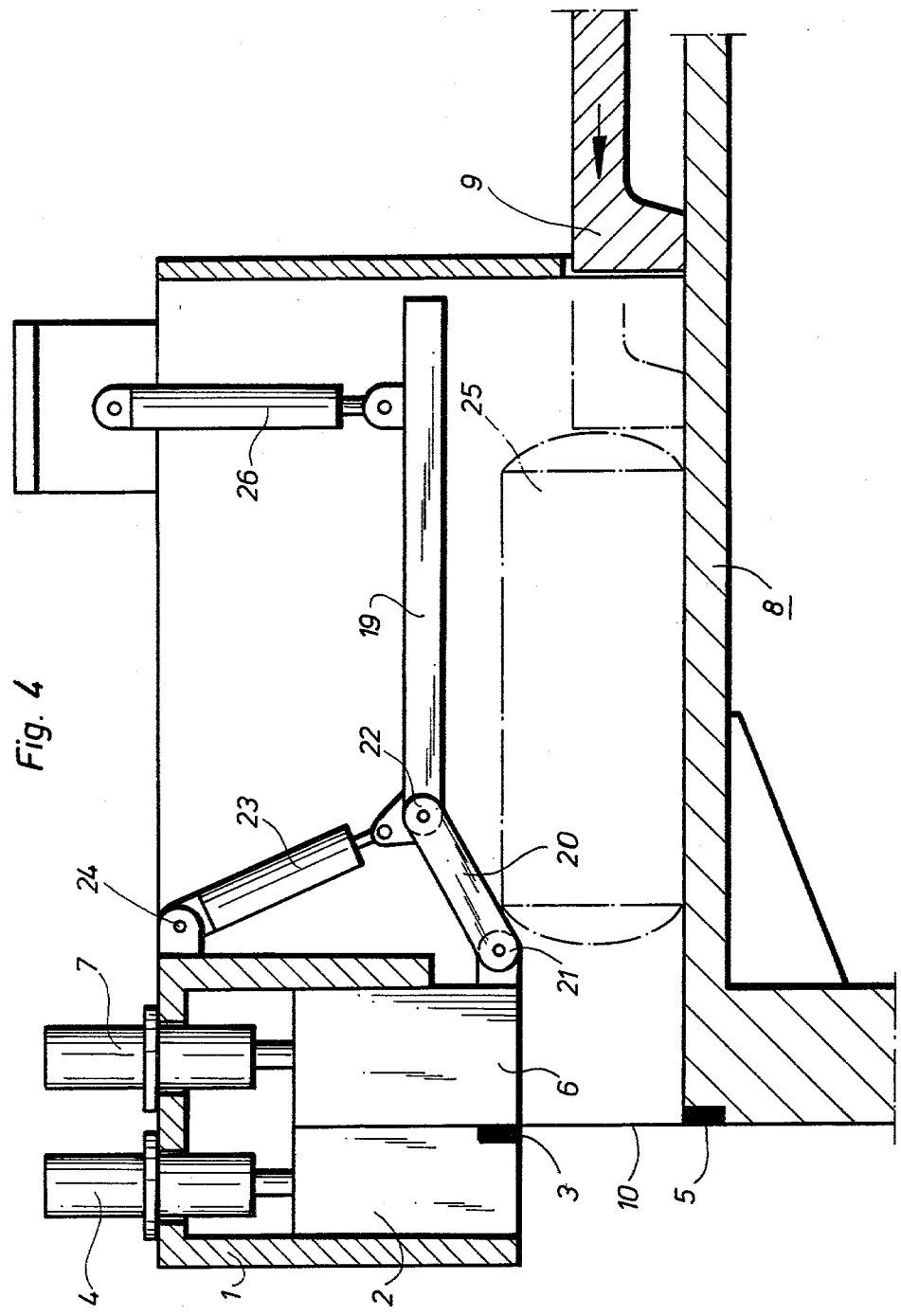

In the second example shown in FIG. 4, the linkage between the crusher 6 and a press bar 19 includes an end plate 20 which at one side is connected to the crusher 6 and on the other side to the press bar 19 with hinge-like joints 21 and 22. The joint 21 is coupled to a ram 23, the other end of which is pivotally connected with the shear frame 1 via a yoke 24. The end plate 20 arranged between the press bar 19 and the crusher 6 enables various different operating methods to be performed depending on the type of scrap to be compacted. The end plate 20 can be adjusted by the ram 23 before, during or after the stroke of the crusher 6. For example, by lowering the crusher 6 and the end plate 20 at the same time, a container 25 indicated in FIG. 4 by the dotted lines, which as is well-known offers the greatest resistance to bending at its ends, can be collapsed so that it can subsequently be pushed under the crusher 6 by the conveyor ram 9 for further compaction. In this operation, the main bending force is supplied by the crusher 6. However, it is also possible that, in the example illustrated, the cylinder drive 23 is at first actuated so that the end plate 20 is pivoted about the joint 21 thereby exerting a leverage effect, until it is in line with the working face of the press bar 19 and then the crusher 8 the end plate 20 and the press bar 19 continue to move synchronously in alignment. A ram 26, linked to the press bar 19 at the end remote from the shear frame 1, takes part similarly to that in the first example.

I claim:

1. A scrap shearer comprising a shear frame, a pair of relatively movable shearing blades mounted in said shear frame, a crusher mounted in said shear frame upstream of said shearing blades, a filling trough upstream of said shear frame, a feed device for feeding scrap along said trough towards said crusher, a press bar for precompacting said scrap in said trough to a predetermined size to enable said crusher and said shearing blades to accommodate said scrap, and a force transferring connection between said shear frame and said filling trough whereby said shear frame reinforces said filling trough, said shearing blades, said crusher, and said press bar all being located in a common plane, said scrap shearer further including an end plate, first pivotal connection means connecting a first side of said end plate to said crusher, second pivotal connection means connecting a second side of said end plate to said press bar, said first side of said end plate being opposite said second side, and a ram arranged and acting between said second connection means and said shear frame.

2. A scrap shearer comprising: a shear frame; a pair of relatively movable shearing blades mounted in said shear frame; a crusher mounted in said shear frame upstream of said shearing blade; a filling trough located upstream of said shear frame; a feed device for feeding scrap along said trough toward said crusher; a press bar for compacting said scrap in said trough to a predetermined size to enable said crusher and said shearing blades to accommodate said scrap; pivotal connection means connecting said crusher and said press bar; and a force transferring connection between said shear frame and said filling trough to provide reinforcement for said filling trough by said shear frame; said shearing blades, said crusher, and said press bar all being located and connected for operative movement within a common plane and in generally common parallel directions.

3. The scrap shear of claim 2, wherein said common plane is inclined to the horizontal.

4. The scrap shear of claim 3, wherein said common plane is inclined at an angle of substantially 45° to the horizontal.

5. The scrap shear of claim 2, wherein said connection means includes an end plate, first pivotal connection means connecting a first side of said end plate to said crusher, second pivotal connection means connecting a second side of said end plate to said press bar, said first side of said end plate being opposite said second side, and a ram arranged and acting between said second connection means and said shear frame.

6. The scrap shearer of claim 2, which further includes a drive ram acting on said press bar at its end remote from said crusher.

7. A scrap shearer comprising a shear frame; a pair of relatively movable shearing blades mounted in said shear frame; a crusher mounted in said shear frame upstream of the said shearing blades; a filling trough upstream of said shear frame; a feed device for feeding scrap along said trough towards said crusher; a press bar for pre-compacting said scrap in said trough to a predetermined size to enable said crusher and said shearing blades to accommodate said scrap; a force transferring connection between said shear frame and said filling trough whereby said shear frame reinforces said filling trough, said shearing blades, said crusher and said press bar all being located in a common plane inclined at substantially 45° to the horizontal; an end plate, first pivotal connection means connecting a first side of said end plate to said crusher; second pivotal connection means connecting a second side of said end plate to said press bar, said first side of said end plate being opposite said second side; and, a ram arranged and acting between said second connection means and said shear frame.

* * * * *